May 1, 1945.                C. E. BENNETT                2,375,068
            METHOD OF FORMING REINFORCED SHEATHED CABLES
                    Original Filed Aug. 20, 1941
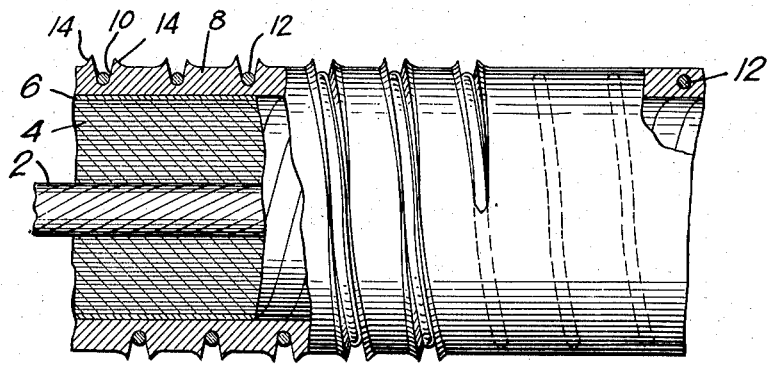
INVENTOR
Charles E. Bennett
BY
Riddle, Bierer and Montgomery
ATTORNEYS Patented May 1, 1945

2,375,068

UNITED STATES PATENT OFFICE 2,375,068

METHOD OF FORMING REINFORCED SHEATHED CABLES

Charles E. Bennett, Ridgewood, N. J., assignor to The Okonite-Callender Cable Company, Incorporated, Paterson, N. J., a corporation of New Jersey Original application August 20, 1941, Serial No. 407,513. Divided and this application January 15, 1942, Serial No. 426,823

1 Claim. (Cl. 29—188)

This invention relates to an improved process for use in connection with lead sheaths of electric cables for the purpose of reinforcing the same, the resulting sheath possessing characteristics that overcome many of the difficulties inherent in cable sheaths as heretofore constructed.

It is well known that the vast majority of failures in lead sheathed cables is due to the mechanical failure of the sheath itself. These sheaths are usually constructed of lead or lead alloys and are unable to withstand pressures in substantial excess of sixty pounds per square inch and even at such a pressure there is a tendency for a cold flow ultimately resulting in sheath failure.

Another problem to be contended with in these sheaths is the difficulty in constructing a sheath which is of uniform wall thickness, these sheaths usually being extruded through a lead press with the result that the sheath is eccentric, that is, not of the same thickness circumferentially of the sheath, and failure will occur at the thin areas.

In some types of cables applied pressures are employed as, for example, gas pressure in telephone cables, gas pressure power cables for high voltages, while in solid type, lead sheathed, oil impregnated cables deleterious pressures are often built up due to overloading the cable.

I am aware, of course, that these inherent difficulties are known to manufacturers and that it has been suggested to armor the cable by winding metal tape, for instance, or wire about the exterior of the sheath. These suggestions have the objection that they increase the overall dimensions of the cable and of course where the installation is underground such reinforcement is exposed to corrosion.

My invention provides a process which although it is extremely simple overcomes these inherent difficulties.

Broadly speaking, I propose to strengthen the sheath radially while imparting elasticity to the same by embedding a very high tensile strength wire in the sheath. This wire is completely covered over so that in the finished sheath there is no increase in the overall dimensions of the cable and no corrosion difficulties are to be contended with. This wire is applied in a continuous length helically of the sheath with a short pitch. For example, in high tension cables where the wall thickness of the sheath is from 1/8 in. to 3/16 in. I find a pitch of approximately 1/4 in. to be satisfactory. In some instances I may even reinforce the sheath longitudinally as well as radially by embedding two wires in the sheath with a basket weave effect.

Various types of wire may be employed but I have had very remarkable results with a steel wire such as piano wire of 26 or 32 gauge. Such a wire has a tensile strength of from between 200,000 to 400,000 pounds and on test I have subjected a length of sheath having such a wire embedded therein to internal pressure as high as 1100 pounds per square inch without any distortion of the sheath. This pressure was the maximum which I could apply with the equipment available but it is my belief that I could have doubled this pressure without any bursting of the sheath. It will be understood, of course, by those skilled in this art that 1100 pounds per square inch is a pressure far in excess of pressures actually met with in cable practice. By way of comparison I might mention that a sample of this same sheath but without the wire burst at 250 pounds per square inch pressure.

My process, of course, has another important advantage. The ordinary lead or lead alloy sheath is inelastic and because of this fact it is customary in oil impregnated cable practice to employ pressure devices or pressure relief devices which are of such a nature that while the impregnating fluid will at all times be under positive pressure these devices will prevent the building up of excessive pressures. These devices are employed to prevent the impregnating fluid from working out of the paper or other pervious type of insulation used when the cable heats up and then failing to return to the insulation on the cooling cycle due to the inelasticity of the lead and sheath. In other words, under the pressures developed in cable operation the sheath is stretched and by reason of the fact that it is inelastic fails to return to its original form. My invention, however, eliminates the necessity of such pressure control devices owing to the elasticity of the wire which is embedded in the sheath and which will stretch when the pressure is built up in the cable but will return to normal as the pressure is taken off.

In the accompanying drawing I have shown one embodiment of my invention in part sectional elevation.

Referring to the drawing in detail: 2 designates a cable conductor and 4 the insulation therefor. So far as my invention is concerned this insulation may take various forms but has been illustrated as oil impregnated, laminated paper.

6 designates the usual shielding tape, generally a copper tape, a few mils in thickness, wrapped about the insulation 4 from one end of the cable to the other.

8 is the cable sheath. This sheath is the usual lead or lead alloy sheath employed in electric cable practice.

In manufacturing the cable the insulated conductor is fed through a lead press where the sheath 8 is extruded about the insulation. As the cable is passing through the lead press a spiral indentation or groove is formed in the sheath periphery as shown at 10. This groove extends helically of the sheath with a short pitch. In forming the groove no metal is removed from the sheath but the metal of the sheath is simply displaced with any suitable tool. The depth of the groove exceeds the diameter of the wire to be laid in it. As above mentioned, the pitch of the helical groove is preferably short. In my experiments and tests I have employed a ¼ inch pitch with good results. As the indentation or groove 10 is being formed or subsequent thereto a steel wire 12, such as the piano wire above mentioned, is laid in the bottom of the groove and then the metal 14 which was displaced in forming the groove is rolled or swaged over upon the wire so that the finished sheath will appear as shown in section at the right hand end of the figure from which it will be seen that the exterior of the sheath is smooth and unbroken and that the wire 12 is completely embedded therein.

Inasmuch as the wire 12 is completely embedded in the sheath no corrosion difficulties will be experienced in installation of the cable. Furthermore, inasmuch as no metal was removed in embedding the wire 12 and inasmuch as the wire itself which, as above mentioned, is of small gauge—say 26 or 32—has a tensile strength of from 200,000 to 400,000 pounds per square inch, the sheath has not been weakened but has been tremendously strengthened mechanically radially of the sheath.

It will be apparent that my process provides a sheath in which the reinforcing wire is completely embedded in the sheath so that there is no danger of corrosion upon installation of the cable and there will be no increase in the overall dimensions of the cable.

It will be appreciated also that the sheath is tremendously strengthened radially due to the high tensile strength of the wire 12.

I have found that in subjecting my improved sheath to the bend test commonly employed in the lead sheath cable industry there has been no distortion of the sheath; in fact, I found that the reinforced sheath looked better than ordinary lead samples do.

Another important characteristic present in all forms of my improved sheath and already referred to above is the elasticity of the sheath thus provided which is due to the presence of the reinforcing wire or wires embedded in the wall of the sheath and extending helically about the sheath axis. This is of the greatest importance in the event that high internal pressure from overload or other cause should be built up in the cable inasmuch as it permits the pressure to be relieved and when the pressure is reduced the sheath will restore itself due to the elasticity of the wire 12 and not remain permanently stretched.

It is to be understood, of course, that while my invention has been described in connection with single conductor cables it is equally applicable to multi-conductor cables.

This application is a division of my copending application Serial No. 407,513, filed August 20, 1941.

What I claim is:

The method which comprises extruding a soft metal sheath about an insulated cable conductor while effecting radial displacement of some of the metal of the sheath to form a pair of continuous circumferential flanges extending helically of the sheath, sufficient metal being displaced in this step so that the bottom of the helical groove thus provided in the sheath periphery is below the surface of the main body of the sheath, laying a continuous length of wire in the bottom of said groove, the diameter of this wire being such that the wire will be wholly below the main body of the sheath, and finally forcing the metal over upon said wire until the wire is completely covered and the sheath presents a smooth unbroken exterior of constant diameter.

CHARLES E. BENNETT.